United States Patent Office 3,764,461
Patented Oct. 9, 1973

3,764,461
RECOVERY AND SEPARATION OF CHEMICALS PRODUCED DURING KRAFT PULPING OPERATIONS
Kenneth W. Baierl, Marysville, Wash., assignor to Scott Paper Company, Philadelphia, Pa.
Filed Sept. 9, 1971, Ser. No. 178,862
Int. Cl. D21c 11/00
U.S. Cl. 162—16
11 Claims

ABSTRACT OF THE DISCLOSURE

Chemicals, such as methanol, ethanol, acetone, dimethyl disulfide, dimethyl sulfide, methyl mercaptan, crude turpentine and hydrogen sulfide which are produced during Kraft pulping operations are recovered by treating liquors containing said chemicals with steam in a fractionating column. The chemicals are further separated by refluxing the more volatile chemicals in said fractionating column to isolate a volatile chemical fraction and a crude turpentine fraction comprising primarily α-terpineol. The chemical present in the volatile chemical fraction can then be separated by a four-step process which comprises:

(a) treating the volatile chemical fraction with a hot caustic solution to remove a sulfur-containing-chemicals fraction from said volatile chemical fraction, (b) treating the volatile chemical fraction with steam in a second fractionating column to get a mixture of chemicals, (c) refluxing the more volatile chemicals present in said mixture to separate a second volatile chemical fraction and a second crude turpentine fraction comprising primarily α-pinene, and (d) separating the chemicals in said second volatile chemical fraction by distillation.

BACKGROUND OF THE INVENTION

Field of the invention

The present invention relates generally to a process for recovering and separating chemicals produced during Kraft pulping operations. More particularly, the invention relates to a process which comprises recovering the chemicals by treating chemical-containing liquors from said operations with steam in a fractionating column and subsequently refluxing the more volatile chemicals in said fractionating column to isolate a volatile chemical fraction and a crude turpentine fraction. The chemicals present in the volatile chemical fraction can then be separated by a four-step process which comprises:

(a) treating the volatile chemical fraction with a hot caustic solution to remove a sulfur-containing-chemicals fraction from said volatile chemical fraction, (b) treating the volatile chemical fraction with steam in a second fractionating column to get a mixture of chemicals, (c) refluxing the more volatile chemicals present in said mixture to separate a second volatile chemical fraction and a second crude turpentine fraction, and (d) separating the chemicals in said second volaitle chemical fraction by distillation.

Description of the prior art

In the preparation of wood pulp useful in paper-making operations wood chips are treated, either chemically or mechanically, to separate the cellulosic fibers. In the sulfate, or Kraft, pulping process wood chips are treated with a cooking liquor containing sodium hydroxide, sodium sulfide and sodium carbonate. The chemicals attack the non-fibrous materials present in the wood chips, reacting with the lignin to form water soluble compounds, thereby allowing separation of the fibrous, or cellulosic, portion of the chips.

The treatment of the wood chips normally takes place in a digester over an extended period of time and at an elevated temperature. The exact time, temperature and pressure depend, to a considerable extent, on the species of wood and the amount of chemicals employed. To maintain a constant temperature and pressure during the chemical treatment, vapors are periodically released from the digester. Also, before the pulp is discharged from the digester the temperature and pressure are lowered by releasing additional vapors. These vapors, together, are preferred to as digester relief gases. Most of these vapors are condensed and the condensate sent to a secondary treatment facility, usually aeration ponds, before leaving the mill as a liquid effluent. The pulp and spent Kraft pulping liquor can be removed from the digester by being blown out at low pressure or dumped. During their removal additional vapors are released which are commonly referred to as digester blow gases. The digester relief gases, digester blow gases and spent Kraft pulping liquor contain chemicals produced during the pulping operation including, for example, methanol, ethanol, acetone, dimethyl disulfide, dimethyl sulfide, methyl mercaptan, crude turpentine and hydrogen sulfide. The type and amount of chemicals in any given sample depends on many factors including the species of wood, treatment chemicals and cooking conditions employed.

After the fibrous pulp is separated, the cooking liquor, now commonly referred to as spent Kraft pulping liquor, or black liquor, and the various condensed gases must be disposed of. In disposing of these materials both economic and environmental factors must be considered and much effort has been expended in recent years to find an economical and practical means for disposing of, especially, the spent Kraft pulping liquor. The most commonly employed treatment is the evaporation of the liquor to recover the sodium salts present therein for reuse in subsequent pulping operations. The evaporator condensates and vent gases from this treatment are also known to contain various chemicals produced during the pulping operation.

The recovery of saleable by-products from the liquors and condensates produced during Kraft pulping operations has been suggested. The recovery of crude turpentine, or pinene, from the relief gases of Kraft digesters is well known. See for example, Casey, Pulp and Paper, vol. 1, second edition, Interscience Publishers, Inc., New York (1960) pages 284–285. However, no commercially acceptable process for recovering all of these chemicals has heretofore been available. Most of the prior art processes recovered only one of the chemicals and the purity of the recovered chemicals was poor requiring further processing to obtain saleable products.

SUMMARY OF THE INVENTION

In accordance with the present invention chemicals, such as methanol, ethanol, acetone, dimethyl disulfide, dimethyl sulfide, methyl mercaptan, crude turpentine and hydrogen sulfide, which are produced during Kraft pulping and similar operations are recovered by treating liquors containing said chemicals with steam in a fractionating column. It should be understood that the term "liquors" as used herein includes both liquors and condensed gases produced during the pulping operation. The chemicals are further separated by refluxing the more volatile chemicals in said fractionating column to isolate a volatile chemical fraction and a crude turpentine fraction. The chemicals present in the volatile chemical fraction can then be separated by a four-step process which comprises:

(a) treating the volatile chemical fraction with a hot caustic solution to remove a sulfur-containing-chemicals fraction from said volatile chemical fraction,
(b) treating the volatile chemical fraction with steam in a second fractionating column to get a mixture of chemicals,
(c) refluxing the more volatile chemicals present in said mixture to separate a second volatile chemical fraction and a second crude turpentine fraction, and
(d) separating the chemicals in said second volatile chemical fraction by distillation.

The quality of the recovered organic chemicals is improved by a preliminary treatment of the chemical-containing liquors with steam prior to the introduction of said liquors into the fractionating column.

DESCRIPTION OF THE PREFERRED EMBODIMENTS

According to the present invention liquors produced during Kraft pulping and similar operations are treated to recover and separate the chemicals contained therein. The chemicals which can be separated by this process depend to a considerable extent on the wood species and cooking conditions employed in the pulping operations and include, for example, dimethyl sulfide, dimethyl disulfide, acetone, methanol, ethanol, methyl mercaptan, hydrogen sulfide and crude turpentine. The crude turpentine includes compounds such as $\alpha$-pinene, camphene, $\beta$-pinene, $\Delta^3$-carene, $\alpha$-terpinene, limonene, p-cymene, terpinolene, terpinene-4-ol, and $\alpha$-terpineol with the major components recovered being $\alpha$-pinene and $\alpha$-terpineol. In general any liquor containing the above-mentioned chemicals, or combinations thereof, can be treated by the present process. Liquors which can be employed include, for example, spent Kraft pulping liquors, condensed digester relief gases, condensed digester blow gases and condensate from the Kraft spent liquor evaporators. Chemical-containing liquors from similar operations, such as soda-based pulping operations, can also be treated in accordance with the present process.

The recovery and separation of the chemicals contained in the above-mentioned liquors comprises (a) treating the chemical-containing liquors with steam in a fractionating column to recover a mixture of chemicals and (b) refluxing the more volatile chemicals present in said mixture to separate a volatile chemical fraction and a crude turpentine fraction. It is especially preferred to further separate the chemicals present in the volatile chemical fraction by a four-step process which comprises:

(a) treating the volatile chemical fraction with a hot caustic solution to remove a sulfur-containing-chemicals fraction from said volatile chemical fraction,
(b) treating the volatile chemical fraction with steam in a second fractionating column to get a mixture of chemicals,
(c) refluxing the more volatile chemicals present in said mixture to separate a second volatile chemical fraction and a second crude turpentine fraction, and
(d) separating the chemicals in said second volatile chemical fraction by distillation.

Figure 2:
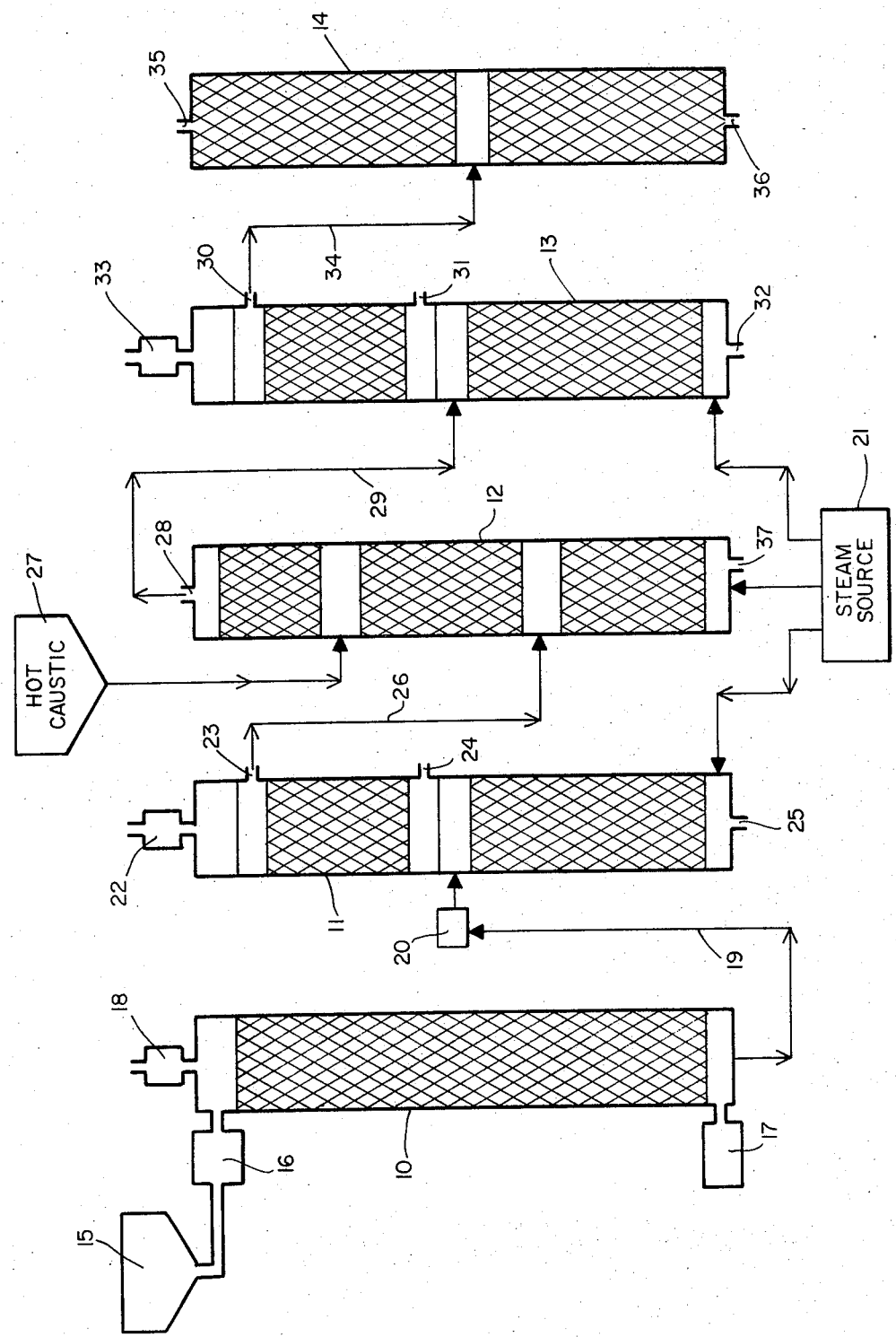
FIG. 2 is a schematic representation of an installation of apparatus arranged to recover and separate chemicals in accordance with the present invention.

An installation of apparatus useful in carrying out the present process is shown in FIG. 2 and includes a first fractionating column, a caustic treatment tower, a second fractionating column and a distillation column. It is especially preferred to include a steam stripper before the first fractionating column.

First fractionating column

The fractionating column is preferably a tubular column, the diameter and height of which are varied in accordance with the volume of liquor being treated. The column is packed with a conventional packing such as, for example, bubble caps; sieve trays; Goodloe 316 SS, a wire mesh packing available from Packed Column Corporation, Springfield, N.J.; or Intalox ¼ inch ceramic saddles available from U.S. Stoneware, Inc., Akron, Ohio. In an especially preferred apparatus means for introducing steam into the fractionating column are attached to the lower end of the column and a condenser is attached on the top of said column to prevent loss of the volatile organic chemicals from said column. The condenser is designed so that hydrogen sulfide gas can escape from the top of the column and be collected. Means located on the side of the column, preferably at a point above the middle of said column, are designed for introducing liquors from the Kraft pulping operation into the column. It has been found that the separation of the volatile chemicals present in said liquors is improved if the liquor is preheated to its bubble point prior to its introduction into the fractionating column. It is especially preferred to preheat the liquor to a temperature of from about 95° C. to about 99° C. For this reason it is preferred to include a preheater for the liquors being introduced into the column. Two taps and internal means for the removal of the chemicals recovered from the liquors are located, one above the other, on the side of the column above the point where the liquors are introduced into said column. The upper tap is designed for the removal of the volatile chemical fraction and the lower tap for the removal of the crude turpentine fraction. If the crude turpentine fraction is not separated in this manner it can be recovered from the water removed from the lower end of the column by decanting since it is lighter than, and insoluble in, the water.

In operation chemical-containing liquors are introduced into the fractionating column at a rate dependent on the size of said column. When working with a column having an inside diameter of 4 inches and a packed height of 20 feet, the liquors are introduced at a rate of from about 0.5 gallon per minute to about 1.5 gallons per minute. Steam is simultaneously introduced into the column in an amount equal to from about 1.0% to about 10.0% of the weight of the liquor. As the liquors pass down the column the steam removes a mixture of the chemicals contained in said liquors. The mixture of chemicals and steam travels up the column and the more volatile chemicals present in the mixture are refluxed at the top of said column. This refluxing of the more volatile chemicals forces a crude turpentine fraction, which has been found to comprise primarily $\alpha$-terpineol, to separate and pass down the column where it can be removed from the lower tap on the column or allowed to pass, with the stripped liquors, from the lower end of the column into a decanter in which it is separated from the stripped liquors. During the refluxing, hydrogen sulfide gas is removed from the condenser located on the top of the column and dimethyl disulfide, when present in the mixture of chemicals, passes to the bottom of the fractionator where it is separated from the stripped liquors. A volatile chemcal fraction, is removed from the tap located near the top of the fractionating column. It is especially preferred to separate the chemicals in the volatile chemical fraction by first treating this fraction in a caustic treatment tower.

Caustic treatment tower

The caustic treatment tower is preferably a tubular column the diameter and height of which are varied in accordance with the volume of liquor being treated. The column is packed with a conventional packing such as those described above for the fractionating column.

Means for introducing the volatile chemical fraction into the column are attached to the side of the column preferably at a point below the middle of said column and means for introducing a hot caustic solution into the column are attached to the side of the column preferably at a point above the middle of said column.

In operation the volatile chemical fraction from the first fractionating column is introduced into the tower at a rate dependent on the size of said tower. A hot caustic solution, such as white cooking liquor or a solution of 50% by weight sodium hydroxide, is simultaneously introduced into the tower. The sulfur-containing chemicals present in said volatile chemical fraction react with the caustic solution to form their sodium salts. The temperature is kept at about 210° F. and the volatile chemical fraction is removed from the top of the tower and transferred to the second fractionating column.

Second fractionating column

The design of the second fractionating column is the same as that of the first.

In operation, as with first fractionating column, the volatile chemical fraction from the caustic treatment tower is introduced into the fractionating column and steam is simultaneously introduced into the bottom of the column. The steam carries the volatile chemicals up the column where they are refluxed at the top of said column. The refluxing of the more volatile chemicals forces a second crude turpentine fraction, which has been found to comprise primarily $\alpha$-pinene, to separate and pass down the column where it can be removed from the lower tap on the column or allowed to pass, with the water, from the lower end of the column. When removed from the bottom of the column the $\alpha$-pinene is separated from the water in a decanter. Since $\alpha$-pinene is partly soluble in water it is especially preferred to recycle the underflow from the decanter back to the first fractionating column. A second volatile chemical fraction is removed from the tap located near the top of the fractionating column and the chemicals contained in said fraction are separated in a distillation column.

Distillation column

The distillation column is preferably a tubular column the diameter and height of which are varied in accordance with the volume of materials being treated. Heating means are attached to the lower end of the column and means for introducing the volatile oragnic chemical fraction from the second fractionating column are attached to the side of the column.

In operation, the second volatile chemical fraction from the second fractionating column is introduced into the column which is heated to a temperature sufficient to cause the volatile organic chemicals to be separated, the more volatile chemicals being removed from the top of the column and the less volatile chemicals from the bottom.

Steam stripper

As mentioned above, it has been found that the purity of, especially, the organic compounds recovered by the present process can be improved if at least part of the hydrogen sulfide is removed from the chemical-containing liquors prior to the introduction of said liquors into the first fractionating column. A pretreatment of liquors with steam prior to the introduction of said liquors into the first fractionating column is especially preferred for removing the hydrogen sulfide. An especially preferred apparatus for carrying out the hydrogen sulfide removal is a steam stripper which comprises a tubular column, the diameter and height of which are varied in accordance with the volume of liquor being treated. The column is packed with a conventional packing such as bubble caps; sieve trays; Goodloe 316 SS, a wire mesh packing available from Packed Column Corporation, Springfield, N.J.; or Intalox ¼ inch ceramic saddles available from U.S. Stoneware, Inc., Akron, Ohio. In this especially preferred apparatus, means for introducing steam are attached to the lower end of the column and means for collecting hydrogen sulfide gases are attached to the upper end of the column. Means, preferably near the upper end of the column, are designed for introducing liquors into the column. It has been found that the separation of the hydrogen sulfide present in said liquors is improved if the liquors are preheated prior to introduction into the steam stripping column. For this reason it is especially preferred to include a preheater for the liquors being introduced into the column.

In operation liquors are introduced into the steam stripping column at a rate dependent on the size of said column. When working with a column having an inside diameter of 4 inches and a height of 4 feet, the liquors are introduced at a rate of from about 1.0 gallon per minute to about 2.0 gallons per minute. Steam is simultaneously introduced into the column in an amount equal to from about 1.0% to about 5.0% of the weight of the liquor. As the liquor passes down the column the steam removes the hydrogen sulfide contained in said liquor. The stripped liquor passes from the lower end of the column to the first fractionating column described above.

If desired, it is possible to introduce steam into the steam stripper at a rate and in an amount sufficient to remove, not only hydrogen sulfide, but also the other chemicals present in the liquors being treated. When this is done, the vapor leaving the top of the steam stripper is introduced directly into the first fractionating column and the material removed from the bottom of the steam stripper, primarily water, is reused in subsequent pulping operations or discarded.

Figure 1:
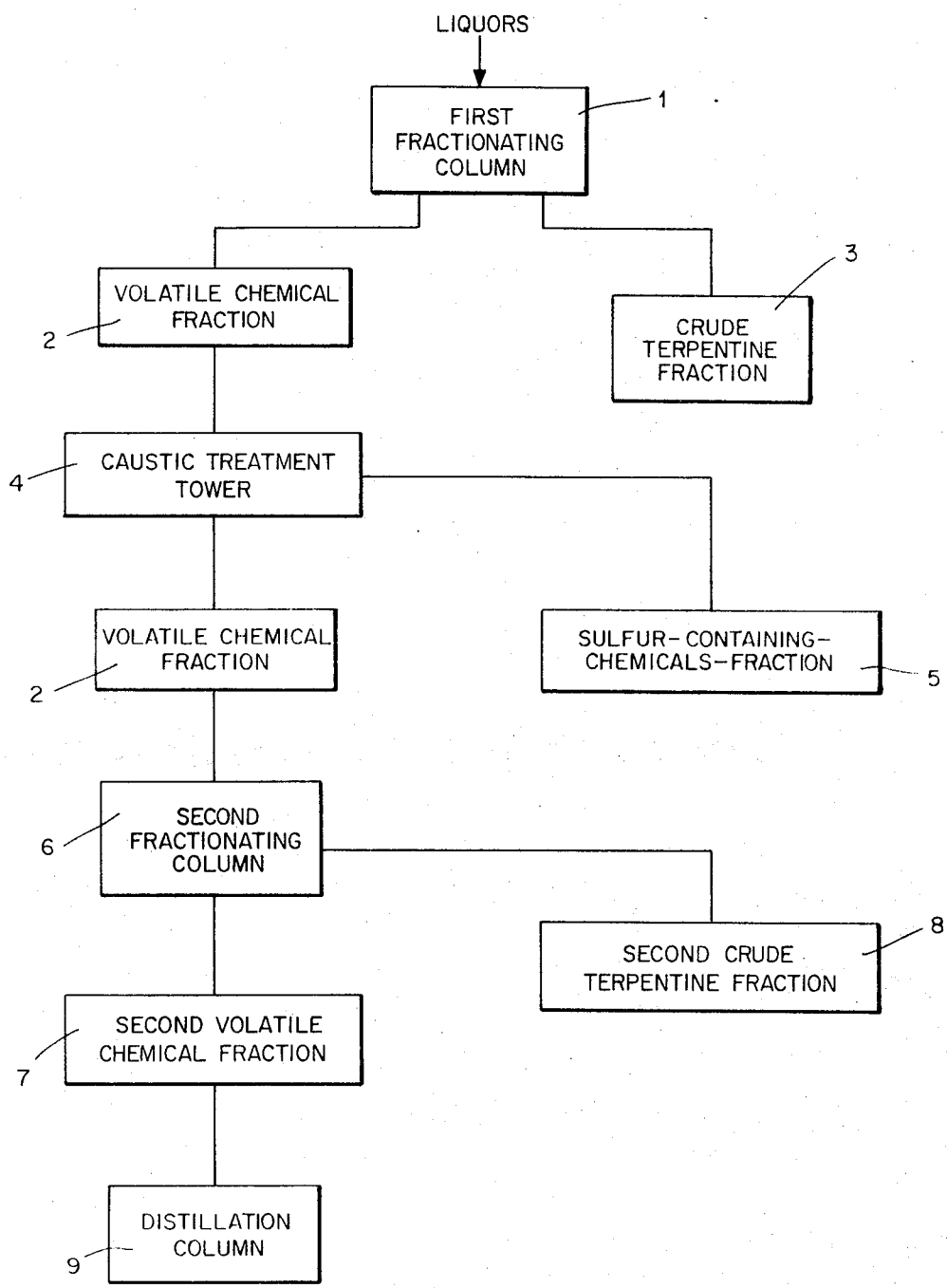
FIG. 1 is a flow chart of the process employed to recover and separate chemicals in accordance with the present invention.

Referring now to the drawings, FIGS. 1 is a flow chart of the process employed to recover and separate chemicals in accordance with the present invention. Liquors from Kraft pulping operations are fed into a first fractionating column 1, wherein the liquors are treated with steam to recover a mixture of chemicals and the more volatile chemicals present in said mixture are refluxed to separate a volatile chemical fraction 2, and a crude turpentine fraction 3. The volatile chemical fraction is then introduced into a caustic treatment tower 4 where it is treated with a hot caustic solution to remove a sulfur-containing chemicals fraction 5 from the volatile chemical fraction 2. The volatile chemical fraction is then fed into a second fractionating column 6 wherein said fraction is treated with steam and the more volatile chemicals are refluxed to separate a second volatile chemical fraction 7 and a second crude turpentine fraction 8. The second volatile chemical fraction is then introduced into a distillation column 9 wherein the chemicals present in said fraction are separated by distillation.

FIG. 2 is a schematic representation of an installation of apparatus arranged to recover and separate chemicals in accordance with the present invention. The apparatus comprises a steam stripper 10, a first fractionating column 11, a caustic treatment tower 12, a second fractionating column 13 and a distillation column 14. In operation chemical-containing liquors from Kraft pulping and similar operations are collected in a storage unit 15 from which they are fed, through a feed preheater 16, and into the top of the steam stripper. A steam source 17 is attached to the lower end of the steam stripper and an outlet 18 for the removal of hydrogen sulfide is attached to the upper end of the stripper. After treatment with steam in the steam stripper the liquors pass through a line 19 and a second feed preheater 20 into the first fractionating column 11 at a point above the middle of said column. The fractionating column has a steam source 21 attached to the lower end of the column and a condenser 22 attached to the top. Two taps 23 and 24 for the removal of the volatile chemical fraction and the crude turpentine fraction are located on the side of the column. An outlet 25 is provided at the bottom of the column for the removal of the treated liquors. The volatile chemical fraction removed from the upper tap 23 is transferred through a line 26 into the caustic treatment tower 12. A hot caustic solution is simultaneously introduced, from a storage unit 27, into the tower which is heated by steam from a steam source 21. A sulfur-containing-chemicals fraction is removed from the lower end of the column by way of an outlet 37. An outlet 28 is located on the top of the tower for removal of the volatile chemical fraction which is transferred through a line 29 to the second fractionating column 13. The fractionating column has a steam source 21 attached to the lower end of the column. Two taps 30 and 31 for the removal of the second volatile chemical fraction and the second crude turpentine fraction are located on the side of the column. An outlet 32 is provided at the bottom of the column for the removal of water and a condenser 33 is attached to the top of the column. The second volatile chemical fraction, removed from the upper tap 30, is transferred through a line 34 into the distillation column 14, where it is distilled to separate the chemicals present in said fraction. Outlets 35 and 36 are provided on the top and bottom of the column.

In order to describe the present invention so that it may be more clearly understood, the following examples are set forth. These examples are set forth primarily for the purpose of illustration, and any specific enumeration of detail contained therein should not be interpreted as a limitation on the concept of this invention.

EXAMPLE I

Douglas fir wood chips are reduced to a pulp by the Kraft pulping process. Digester relief gases, digester blow gases, and evaporator vent gases are accumulated and introduced into a first fractionating column. The fractionating column consists of a tubular glass column having an inside diameter of 4 inches and a height of 260 inches. The column is packed with 144 inches of ¼ inch Intalox ceramic saddles available from U.S. Stoneware, Inc., Akron, Ohio, below the point at which the liquors are introduced into said column, and 48 inches of Goodloe 316 SS, a wire mesh packing available from Packed Column Corporation, Springfield, N.J., at the top.

The rate of introduction of the liquors is adjusted to from about 0.5 to about 1.5 gallons per minute. Steam is simultaneously introduced into the column at a rate of from about 2% to about 15% of the weight of the liquors. As the liquors pass down the column the steam removes a mixture of chemicals from said liquors. The steam containing the chemicals passes up the column where the more volatile chemicals present in said mixture are refluxed. When the temperature of the vapor at the top of the column reaches 170° F. the volatile chemicals are removed, by a tap located on the side of the column, at a rate sufficient to maintain the vapor temperature of 170° F. at the top of the column. A crude turpentine fraction, comprising primarily α-terpineol, is removed from the lower tap located on the side of the column.

The volatile chemical fraction from the first fractionating column is fed into a caustic treatment tower where it is treated with a 50% by weight solution of sodium hydroxide. The temperature in the tower is kept at about 210° F. forcing the volatile chemical fraction from the top of the tower and leaving a sulfur-containing-chemicals fraction. The volatile chemical fraction is introduced into a second fractionating column which is identical with the first and operates in the same manner. When the temperature of the vapor at the top of said second fractionating column reaches from about 145° F. to about 150° F. a second volatile chemical fraction is removed from the upper tap. A second crude turpentine fraction, comprising primarily α-pinene, is removed from the lower tap.

The second volatile chemical fraction is introduced into a distillation column and the chemicals contained therein, primarily methanol, are separated.

EXAMPLE II

Douglas fir wood chips are reduced to a pulp by the Kraft pulping process. The digester relief gases are collected, heated to a temperature of 99° C. and introduced into the top of a steam stripper. The stripper consists of a tubular glass column having an inside diameter of 4 inches and a height of 82 inches and is packed with 48 inches of Goodloe Packing 316 SS, a wire mesh packing available from Packed Column Corporation, Springfield, N.J. Steam is simultaneously introduced into the lower end of the steam stripper at a rate equal to about 2% of the weight of the condensed digester relief gases. Hydrogen sulfide and methyl mercaptan are removed from the top of the stripper. Material removed from the bottom of the steam stripper is subsequently treated as in Example I.

EXAMPLE III

Douglas fir wood chips are reduced to a pulp by the Kragt pulping process. The spent Kraft pulping liquor is collected and evaporated to from about 12% to about 60% solids. The evaporator condensate is collected, heated to 98° C. and introduced into the steam stripper described in Example II. Steam is simultaneously introduced into the lower end of said stripper at a rate equal to from 2% to 15% of the weight of the evaporator condensate. The condensed vapors from the stripper are introduced into a fractionating column similar to the first fractionating column described in Example I, treated with steam and the more volatile chemicals refluxed. This treatment results in the separation of a volatile chemical fraction comprising at least 90% methanol and a second fraction comprising at least 90% crude turpentine.

EXAMPLE IV

Evaporator condensate produced as in Example III, is collected, heated to 98° C. and introduced directly into a fractionating column similar to that described in Example I. Steam is simultaneously introduced into the lower end of said column at a rate equal to from about 5% to about 15% of the weight of the liquor. The steam removes a mixture of chemicals from the liquor. The steam containing the chemicals passes up the column where the more volatile chemicals present in said mixture are refluxed. This refluxing of the more volatile chemicals forces a crude turpentine fraction and dimethyl disulfide down the column. These materials are removed, along with the water, from the bottom of the column and placed in a decanter. The crude turpentine fraction is lighter than water and forms a separate layer which is removed from the decanter. The dimethyl disulfide which is heavier than water collects on the bottom of the decanter and is removed along with some unidentified polymeric material.

What is claimed is:

1. A method for recovering and separating chemicals produced during Kraft pulping operations which comprises:
   (a) stripping chemical-containing liquors from said operations with steam in a fractionating column to recover a mixture of chemicals,
   (b) refluxing the more volatile chemicals present in said mixture to separate a volatile chemical fraction and at least two immiscible fractions within said fractionating column, said fractions including stripped liquors and an immiscible crude turpentine fraction comprising substantially α-terpineol,
   (c) removing a portion of the volatile chemical fraction from said fractionating column, and
   (d) removing stripped liquors and the immiscible crude turpentine fraction from the lower end of said fractionating column.

2. A method for separating the chemicals present in the volatile chemical fraction produced as claimed in claim 1, which comprises:
  (a) treating the volatile chemical fraction with a hot caustic solution to remove a sulphur-containing-chemicals fraction from said volatile chemical fraction,
  (b) treating the volatile chemical fraction with steam in a second fractionating column to get a mixture of chemicals,
  (c) refluxing the more volatile chemicals present in said mixture to produce a second volatile chemical fraction and immiscible fractions in said second fractionating column, said immiscible fractions being an aqueous fraction and a second immiscible crude turpentine fraction,
  (d) removing said second volatile chemical fraction from a tap near the top of said second fractionating column, and
  (e) removing water and said immiscible second crude turpentine fraction from the lower end of said second fractionating column.

3. A method, as claimed in claim 1, wherein the refluxing and removing of the volatile chemical fraction are controlled to maintain a top temperature in the fractionating column of about 170° F.

4. A method, as claimed in claim 2, in which the second crude turpentine fraction comprises α-pinene and in which the removing of the second volatile chemical fraction is controlled to maintain the temperature at the top of the second fractionating column from about 145° F. to about 150° F.

5. A method, as claimed in claim 1, in which the chemical containing liquors are treated with steam, to remove at least part of the hydrogen sulfide contained therein, prior to introduction into the fractionating column.

6. A method, as claimed in claim 1, in which the mixture of chemicals comprises methanol, ethanol, acetone, dimethyl disulfide, dimethyl sulfide, methyl mercaptan, crude turpentine and hydrogen sulfide.

7. The method of claim 1 wherein said stripped liquors are removed from the bottom of said fractionating column and wherein said immiscible crude turpentine fraction is removed from a tap at the lower end of said fractionating column.

8. The method of claim 1 wherein the chemical containing liquors contain dimethyl disulfide and the refluxing produces a third immiscible fraction of said dimethyl disulfide which is removed from the bottom of the fractionating column.

9. The method of claim 1, wherein said stripped liquors and said immiscible crude turpentine fraction are removed from the bottom of said fractionating column and then separated by decanting.

10. The method of claim 2 wherein said water is removed from the bottom of said second fractionating column and wherein said immiscible second crude turpentine fraction is removed from a lower tap on said second fractionating column.

11. The method of claim 2 wherein said water and said immiscible second crude turpentine fraction are both removed from a common tap at the bottom of said second fractionating column and then separated by decanting.

References Cited

UNITED STATES PATENTS

| | | | |
|---|---|---|---|
| 3,655,803 | 4/1972 | Miller | 260—675.5 |
| 2,283,067 | 5/1942 | Jennings | 260—675.5 |
| 2,459,570 | 1/1949 | McGregor | 162—15 |
| 3,660,512 | 5/1972 | Hamby et al. | 260—675.5 |
| 3,312,750 | 4/1967 | Berg et al. | 260—675.5 |
| 2,282,982 | 5/1942 | Jenett | 260—675.5 |
| 942,106 | 12/1909 | Rowley | 162—16 |

FOREIGN PATENTS

| | | | |
|---|---|---|---|
| 241,965 | 1965 | Austria | 260—675.5 |

OTHER REFERENCES

Rinman, "Manufacture of Cellulose from Wood," Paper Trade Journal Mar. 28, 1912, pp. 48, 56 and 60.

S. LEON BASHORE, Primary Examiner

A. D'ANDREA, JR., Assistant Examiner

U.S. Cl. X.R.

162—15; 203—98; 260—675.5

PO-1050
(5/69)

UNITED STATES PATENT OFFICE
CERTIFICATE OF CORRECTION

Patent No. 3,764,461               Dated   October 9, 1973

Inventor(s)   Kenneth W. Baierl

It is certified that error appears in the above-identified patent and that said Letters Patent are hereby corrected as shown below:

Column 1, line 22, "chemical", first occurrence, should read -- chemicals --.
        line 63, "volaitle" should be --volatile--

Column 2, line 15, "preferred" should be --referred--

Column 8, line 23, "Kragt" should be --Kraft--

Signed and sealed this 5th day of March 1974.

(SEAL)
Attest:

EDWARD M. FLETCHER, JR.                C. MARSHALL DANN
Attesting Officer                      Commissioner of Patents